United States Patent
Kalwa

(10) Patent No.: US 10,981,370 B2
(45) Date of Patent: Apr. 20, 2021

(54) METHOD FOR PRODUCING A LAMINATE CONSISTING OF A BACKING SHEET AND DECORATIVE PAPER

(71) Applicant: Flooring Technologies Ltd., Kalkara (MT)

(72) Inventor: Norbert Kalwa, Horn-Bad Meinberg (DE)

(73) Assignee: Flooring Technologies Ltd., Kalkara (MT)

(*) Notice: Subject to any disclaimer, the term of this patent is extended or adjusted under 35 U.S.C. 154(b) by 0 days.

(21) Appl. No.: 15/741,561

(22) PCT Filed: Jun. 21, 2016

(86) PCT No.: PCT/EP2016/064291
§ 371 (c)(1),
(2) Date: Jan. 3, 2018

(87) PCT Pub. No.: WO2017/009011
PCT Pub. Date: Jan. 19, 2017

(65) Prior Publication Data
US 2018/0194123 A1    Jul. 12, 2018

(30) Foreign Application Priority Data

Jul. 16, 2015   (EP) .................................. 15177033

(51) Int. Cl.
*B29C 65/00*   (2006.01)
*B32B 37/12*   (2006.01)
(Continued)

(52) U.S. Cl.
CPC .......... *B32B 37/1284* (2013.01); *B27N 7/005* (2013.01); *B32B 7/12* (2013.01);
(Continued)

(58) Field of Classification Search
CPC ... B29C 65/481; B29C 65/486; B29C 65/522; B29C 65/64; B32B 7/12; B32B 21/02; B32B 21/06; B32B 37/24
(Continued)

(56) References Cited

U.S. PATENT DOCUMENTS

2008/0032120 A1   2/2008   Braun
2008/0226874 A1   9/2008   Kalwa
(Continued)

FOREIGN PATENT DOCUMENTS

BE   201505419 A1 *   7/2015
DE   19751115 A1      5/1999
(Continued)

OTHER PUBLICATIONS

Eltex, "Datasheet Aufladeelektrode R120/R121A"; pp. 1-8, English-language version attached.
(Continued)

*Primary Examiner* — Philip C Tucker
*Assistant Examiner* — Nickolas R Harm
(74) *Attorney, Agent, or Firm* — The Webb Law Firm

(57) ABSTRACT

The present invention relates to a method for producing a laminate having a backing sheet and a decorative paper arranged on the backing sheet, including the steps of: a) providing the backing sheet, b) scattering at least one layer of at least one powdered resin onto at least one side of the backing sheet, the surface of the side of the backing sheet that is to be scattered with the powdered resin being unsmoothed, c) placing at least one decorative paper onto the side of the backing sheet that is provided with the powdered resin, and d) pressing the layered structure including the backing sheet, the powdered resin and the decorative paper. The present invention likewise relates to a laminate that can be produced by this method.

32 Claims, 2 Drawing Sheets

(51) Int. Cl.
*B32B 37/24* (2006.01)
*B44C 5/04* (2006.01)
*B27N 7/00* (2006.01)
*B32B 7/12* (2006.01)
*B32B 21/02* (2006.01)
*B32B 21/06* (2006.01)
*B29C 65/48* (2006.01)
*B29C 65/64* (2006.01)
*B29C 65/52* (2006.01)

(52) U.S. Cl.
CPC .............. *B32B 21/02* (2013.01); *B32B 21/06* (2013.01); *B32B 37/24* (2013.01); *B44C 5/04* (2013.01); *B44C 5/0492* (2013.01); *B29C 65/481* (2013.01); *B29C 65/486* (2013.01); *B29C 65/522* (2013.01); *B29C 65/64* (2013.01); *B32B 2250/02* (2013.01); *B32B 2317/125* (2013.01); *B32B 2317/16* (2013.01); *B32B 2451/00* (2013.01)

(58) Field of Classification Search
USPC .... 156/62.2, 155, 273, 276, 284, 308.2, 500
See application file for complete search history.

(56) References Cited

U.S. PATENT DOCUMENTS

| | | |
|---|---|---|
| 2011/0117340 A1 | 5/2011 | Oldorff |
| 2012/0318453 A1 | 12/2012 | Zierold |
| 2013/0177742 A1 | 7/2013 | Siebert et al. |
| 2014/0178630 A1 | 6/2014 | Pervan et al. |
| 2014/0186610 A1 | 7/2014 | Pervan |
| 2014/0199558 A1* | 7/2014 | Pervan ............... E04C 2/246 428/530 |
| 2015/0314639 A1 | 11/2015 | Kalwa |
| 2017/0334088 A1* | 11/2017 | Lehnhoff ............. B27N 7/005 |
| 2018/0195291 A1* | 7/2018 | Loncke ............... B32B 7/12 |

FOREIGN PATENT DOCUMENTS

| | | | |
|---|---|---|---|
| DE | 10156956 A1 | 6/2003 | |
| DE | 102004026739 A1 | 12/2005 | |
| DE | 102007012236 B4 | 10/2013 | |
| EP | 2236313 A1 | 10/2010 | |
| EP | 2743094 A1 * | 6/2014 | ........... B44C 5/0469 |
| EP | 2743094 A1 | 6/2014 | |
| EP | 2762328 A1 | 8/2014 | |
| EP | 3023261 A1 * | 5/2016 | .............. B44C 5/04 |
| KR | 1020120104614 A | 9/2012 | |
| WO | 2011129755 A2 | 10/2011 | |
| WO | 2012037950 A1 | 3/2012 | |
| WO | 2013032387 A1 | 3/2012 | |

OTHER PUBLICATIONS

TPS (TechnoPartner Samtronic) GmbH, Präzisionsstreuer, "Oszil-lierendes Ausbürstsystem" (2013), pp. 1-4; English-language version attached.

* cited by examiner

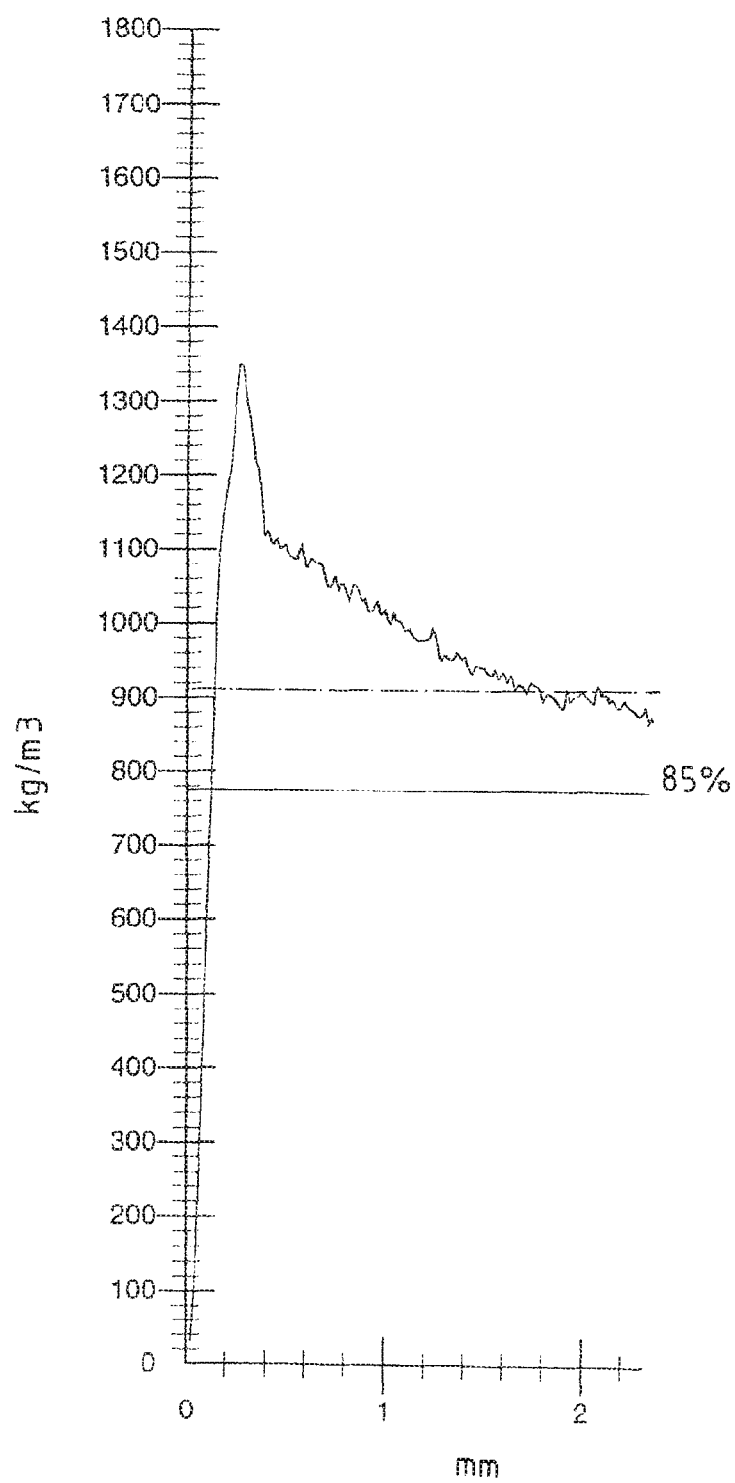

METHOD FOR PRODUCING A LAMINATE CONSISTING OF A BACKING SHEET AND DECORATIVE PAPER

CROSS-REFERENCE TO RELATED APPLICATIONS

This application is the United States national phase of International Application No. PCT/EP2016/064291 filed Jun. 21, 2016, and claims priority to European Patent Application No. 15177033.6 filed Jul. 16, 2015, the disclosures of which are hereby incorporated in their entirety by reference.

BACKGROUND OF TITLE INVENTION

Field of the Invention

The present invention relates to a method for producing a laminate and to a laminate producible by such a method.

Description of Related Art

In the production of material boards, more particularly in the form of laminated material boards, various papers, such as decorative paper, overlays or backing papers, for example, are typically applied to a suitable carrier board.

Before the said papers are applied to carrier boards, such as wood fiber carrier boards, for example, be surfaces of the carrier boards are first of all sanded, in order to ensure sufficient adhesion of the papers used to the surface of the carrier boards.

The sanding operation is normally carried out after a short cooling phase of the carrier boards after departing the press unit directly after the production of the carrier boards. The sanding operation brings about depletion of the press skin formed on the top and bottom of the wood fiber boards after pressing. In the production of the wood composite boards, this press skin comes about in the heating presses by virtue of the direct contact of the resinated particles and fibers with the hot pressing belts in the case of continuous presses. This contact is accompanied by cracking of the wood fibers and the resin. The press skin or rotted zone has a thickness of around 0.2 mm. On coating with papers impregnated with melamine resin, this press skin is not sufficiently consolidated by the flow of resin, and then results in a weak zone in the outer layer. Additionally, as a result of the pressing conditions in the short cycle (SC) process (T=200° C., T=10 seconds), the carrier is weakened in the outer layer by processes of thermal degradation, which further exasperates the weak zone.

In a densogram of the board, this weak zone can be discerned as a drop in apparent density. The drop in apparent density is typically situated 0.2-0.3 mm beneath the surface of the coated board. This is particularly problematic in cases of severe mechanical stress arising from milling, such as in the production of laminate flooring, for example.

In order to prevent this drop in apparent density, the surface of the carrier board bearing the press skin is sanded, usually with a sanding attrition of 0.1-0.3 mm per side. For this reason, the boards must have a greater thickness by a corresponding sanding addition, as a result of which the production costs are negatively influenced. In the production of a flooring laminate having a thickness of 7 mm, for example, the thickness of the carrier board prior to sanding must be at least 7.2 mm. In percentage terms, the loss of material during sanding is particularly high in the case of thin boards, which is therefore particularly serious in terms of cost in the case of laminate flooring. In this situation, consolidation of the weak zone would enable considerable cost savings through the saving of material and of job steps.

It is known from EP 2236313, moreover, that the press skin must be removed by sanding, since in the region of the press skin the introduction of heat during hot pressing is so high that the adhesive cures too rapidly, resulting in rupturing of resin bridges, a phenomenon which may lead in turn to delamination of the decorative papers applied to the carrier board.

The presently employed operation of sanding prior to coating with a paper, such as a decorative paper, for example, therefore has the disadvantages of loss of material and loss of time, owing in particular to an additional job cycle and additional capital investments.

For the adhesive bonding of papers or preimpregnated systems onto wood composite boards, it is also known practice to apply liquid resins, especially formaldehyde-containing liquid resins, to the surface of the paper that is to be applied. Adhering can then be done with or without intermediate drying (EP 2743094). In this case, however, there is no consolidation of the outer layer of the carrier board; instead, decorative papers are bonded on the wood composite board. During the adhesive bonding, moreover, the weak zone of the plate is not excessively stressed by high temperatures (around 200° C.) over a relatively long period such as, for example, 10 seconds. In this case the lamination of papers takes place customarily at temperatures of around 160-180° C. with contact times on the pressing calender of around 1 second.

On the other hand, it is known practice from EP 2762328 A1 to apply, to the surface of a wood composite board, a liquid resin, to which further liquid layers in the form of priming layers and color layers are applied in the subsequent steps, these applied layers being subsequently dried. In that case, however, impregnated papers are not employed; instead, the decoration is applied directly in the form of liquid ink layers on the likewise liquid priming layer.

SUMMARY OF THE INVENTION

A technical problem therefore underlying the present invention is avoiding the step of the sanding of the surface of wood composite boards. The intention here is to use technical measures to consolidate the rotted zone or the weak zone to such an extent as to enable coating with decorative papers, especially with impregnated decorative papers. At the same time there are to be no qualitative deficiencies apparent in the further processing.

This problem is solved by the provision of a method as described herein and of a laminate producible by this method.

Provided accordingly is a method for producing a laminate consisting of a carrier board and a decorative paper disposed on the carrier board, the method comprising the following steps:

a) providing the carrier board,
b) scattering at least one layer of at least one pulverulent resin onto at least one side, more particularly the top side, of the carrier board, where the surface of that side of the carrier board on which the pulverulent resin is to be scattered is unsanded;
c) placing at least one decorative paper onto the side of the carrier board that bears the pulverulent resin, and
d) compressing the layer system composed of carrier board, pulverulent resin and decorative paper.

The present method is therefore characterized in that a resin, such as a formaldehyde resin, for example, which frequently functions in liquid form as binding and impregnating agent, is scattered on in solid form, and here in particular as a powder, onto a carrier board. Consequently, after the resin powder has been scattered onto the top side of the carrier board, a ply or layer of a dry powdery resin is formed. The powder ply of a resin is preferably a continuous layer of solid material whose thickness is determined by the quantity of resin used.

As a result of the application of the pulverulent resin, the surface of the carrier board, which consists preferably of wood fibers, is enhanced in the subsequent compressing operation. By virtue of the high temperature and the pressure, the resins (i.e., not only the pulverulent resin on the carrier board but also the impregnating resin of the decorative paper) are liquefied and wet the region of the outer layer of the carrier board. At the same time, the resin used is chemically crosslinked.

In accordance with the present method, the surface of that side of the carrier board on which the pulverulent resin is to be scattered is unsanded; in other words, the surface of the carrier board presently used, in the form of a wood composite board, bears a pressed skin or rotting layer. Consequently, the step of the sanding of the surface of the wood fiber material board after the compressing of the wood fibers and binder is omitted. Forgoing the step of sanding the wood composite board thus reduces the number of job steps and therefore results in a saving in costs and in materials.

In one embodiment, the amount of pulverulent resin applied to the surface of the carrier board is 3-20 $g/m^2$, preferably 5-15 $g/m^2$, especially preferably 6-10 $g/m^2$, e.g., 6, 10 or 20 $g/m^2$. The quantity of resin used is a function of the nature and thickness of the carrier board arriving from the pressing machine, and also of the desired layer thickness of the pulverulent resin, which is governed in turn by the attainable lifting resistance of the decorative papers to be applied to the carrier board. The rule here is that the desired effect increases as the quantity of powder goes up, with a positive effect occurring at a powder quantity of as little as 3 $g/m^2$.

The pulverulent resin employed has a scatter density of 0.5 to 1.5 kg/l, preferably 0.8 to 1.0 kg/l, and an average particle size of 10 to 50 m, preferably 20 to 30 m, especially preferably of 25 μm.

The pulverulent resin presently used has only small traces of moisture. Hence the moisture content ought not to exceed 0.5%, since otherwise there is caking and it is no longer possible to carry out scattering.

In a further variant of the present method, the side or surface of the carrier board on which the pulverulent resin is to be scattered is pretreated before the scattering of the pulverulent resin to improve the adhesion of the pulverulent resin on the surface of the carrier board. This pretreatment may comprise subjecting the side or surface to moisture, or electrostatically charging the side or surface of the carrier board.

In the case of subjecting the board to liquid or moisture, it is possible to apply 0.5-5 g of water per $m^2$, preferably 1 g to 2 g of water per $m^2$, by means of suitable apparatuses such as, for example, a rotor spray unit.

In the case of electrostatic charging, a surface of a board or of a web of goods is charged (negatively charged) using one or more electrodes. Subsequently, for example, an impregnated paper or a powder is applied. The electrical charging causes the two to adhere to one another. The device used in the case of electrostatic charging is compact, this being beneficial in space terms when retrofitting an existing plant.

The pulverulent resin used is a formaldehyde resin, preferably a urea resin, a melamine resin or a phenolic resin, especially preferably a melamine-formaldehyde resin, a melamine-phenol-formaldehyde resin or a melamine-urea-formaldehyde resin. Other resins, such as epoxy resins, can also be scattered on, however.

In another variant of the present method it is possible for the other side of the carrier board, i.e., the side opposite the side of the carrier board on which the pulverulent resin is to be scattered, to be provided likewise with a pulverulent resin. In that case the pulverulent resin is scattered onto at least one side of at least one backing paper, and the backing paper scattered with the resin powder is disposed with the resin in the direction of the side of the carrier board, or the carrier board is placed onto the backing paper scattered with the pulverulent resin.

The pulverulent resin used in this case has the same properties and the same composition as the resin for scattering onto the top side of the carrier board. In one embodiment, the amount of pulverulent resin applied to the surface of the backing paper is 3-20 $g/m^2$, preferably 5-15 $g/m^2$, especially preferably 6-10 $g/m^2$.

Likewise, the side of the carrier board to be coated with the backing paper, and/or the side of the backing paper to be scattered with the pulverulent resin, is pretreated, prior to scattering of the pulverulent resin, in order to improve the adhesion of the pulverulent resin, the pretreatment comprising, in particular, subjection to moisture or electrostatic charging.

The pulverulent resin is preferably applied using a scattering apparatus. Scattering is accomplished preferably in a continuous through-travel operation. One suitable scattering apparatus is the "Oszillierendes Ausbürstsystem" precision scatterer from TPS.

The decorative paper to be placed onto the layer of the pulverulent resin is preferably an at least partially impregnated decorative paper. Accordingly, in the present method, it is possible to use not only a partially impregnated decorative paper, i.e., a decorative paper impregnated on one side, but also a completely impregnated decorative paper.

In the case of a single-sidedly impregnated decorative paper, it is only the entire area of the unprinted bottom side of the decorative paper, in other words the side of the decorative paper opposite from the facing side, that is provided uniformly with an impregnating resin. The quantity of resin applied in this case is between 30% and 70% by weight, preferably between 40% and 60% by weight, especially preferably 50% by weight, based on the paper weight of the decorative paper.

Conversely, in the case of a fully impregnated decorative paper, a resin quantity of 90-110% by weight, based on the paper weight of the decorative paper, is applied.

In view of the reduced amount of applied impregnating resin, single-sidedly impregnated decorative papers exhibit reduced dimensional change as compared with fully impregnated papers. Thus the dimensional change of a single-sidedly impregnated decorative paper is 0.2-0.4% in length and 0.5-0.9% in width. In comparison to this, the figures for fully impregnated papers are between 0.4-0.9% in length and 1.2-1.8% in width.

After the at least partly impregnated decorative paper has been placed onto the layer of pulverulent resin, the layer system composed of carrier board, pulverulent resin and decorative paper can be compressed, especially in an SC press. The pressing time is between 5 and 60 seconds, preferably between 10 and 30 seconds. The pressing temperature is between 150 and 250° C., preferably 250° C., and the pressure applied in the press is between 10 and 100 bar, preferably between 20 and 60 bar, especially between 30 and 40 bar.

It is also conceivable and desirable, however, to perform further refinement of the surface after the applying and optionally intermediate drying of the decorative paper on the carrier board.

Accordingly, in another embodiment of the present method, after the decorative paper impregnated on the side opposite from the decoration has been placed onto the carrier board, and optionally after intermediate drying, in a further step c1), at least one further layer of a pulverulent resin is applied or scattered onto the top side or facing side of the decorative paper.

This further layer for application may consist merely of a pulverulent resin, or else it is possible to use a mixture comprising the resin, natural and/or synthetic fibers, wear-reducing particles, and, optionally, further additives.

The powder in this case is composed of 30% to 65% by weight, preferably 40% to 60% by weight, of fibers, 20% to 45% by weight, preferably 30% to 40% by weight, of binders, 5% to 25% by weight, preferably 10% to 20% by weight, of abrasion-resistant particles, and 0% to 8% by weight, preferably 0.5% to 6% by weight, of additive.

According to a further embodiment, it is also possible, after the decorative paper impregnated on the side opposite from the decoration has been placed onto the carrier board, to apply at least one overlay, more particularly a resin-impregnated overlay, in an alternative further step c2).

The natural and/or synthetic fibers are preferably selected from a group of bleached cellulose fibers or organic polymer fibers.

The abrasion-resistant particles are preferably selected from the group encompassing aluminum oxides, corundum, boron carbides, silicon dioxides, silicon carbides and glass beads, with corundum and glass beads being particularly preferred.

It is likewise possible for the mixture to be admixed with at least one color pigment selected from a group encompassing titanium dioxide, zinc oxides, iron oxide pigments or metallic effect pigments. In this case there are no limits on the variability and the design possibilities.

As already mentioned above, it is also possible to add further additives to the mixture. In that case said at least one additive may be selected from a group encompassing conductive substances, flame retardants, luminescent substances, and metals. Conductive substances designated in this case are carbon fibers and nanoparticles, especially carbon nanotubes. Typical flame retardants are selected from the group encompassing phosphates, borates, especially ammonium polyphosphate, tris(tribromoneopentyl) phosphate, zinc borate or complexes of boric acid with polyhydric alcohols. Fluorescent and phosphorescent substances include, in particular, zinc sulfite and alkaline earth metal aluminates.

In a further embodiment, the carrier board consists of a wood composite, or a wood composite/plastics mixture, preference being given in particular to particle boards, medium density fiber (MDF) boards, high-density fiber (HDF) boards, oriented strand boards (OSB) or plywood boards, or else a cement fiber board and/or gypsum fiber board may be used.

As observed above, the layer system composed of carrier board, pulverulent resin, decorative paper and optionally further resin layers is compressed. The compressing of the layer system takes place preferably in a through-travel press, but more preferably in a short-cycle press. The compressing of the layer system results in the formation of a surface structure above the decoration, optionally in congruence with the decoration, in the form of what is called "emboss in register".

In a further variant of the method, at least one backing is applied to the opposite side of the carrier board, the side not provided with the decorative paper, and this backing may have a scattering of the pulverulent resin or else is not scattered with the pulverulent resin.

It is also possible for the board coated by means of the present method to be transferred together with a backing paper into a short-cycle press, where the synthetic resins cure at high pressure and at high temperature; in this case, as already mentioned above, in one variant, it is possible for a protective overlay to be placed on in the form of an impregnated overlay. The latter may also be performed in order to achieve enhanced wear resistance. This may be necessary particularly where the floor coverings are used in highly stressed properties.

The laminates produced with the present method comprise at least one ply of at least one pulverulent resin scattered onto at least one unsanded side of a carrier board, and at least one decorative paper.

Accordingly, the present laminate comprises at least one ply of at least one pulverulent resin scattered onto at least one unsanded side of a carrier board, and at least one decorative paper and/or backing paper, where the pulverulent resin melts during compressing and enhances the at least one unsanded side of the carrier board, so that the carrier board has at least one side, enhanced by means of the pulverulent, melted-on resin, below the at least one decorative paper and/or backing paper.

BRIEF DESCRIPTION OF THE DRAWING

The present invention is elucidated below and described using a number of working examples, with reference to the figures, for better understanding. In the figures FIG. 2 shows a detail of a densogram of an embodiment of the laminate of the invention.

DESCRIPTION OF THE INVENTION

Working Example 1

Figure 1:
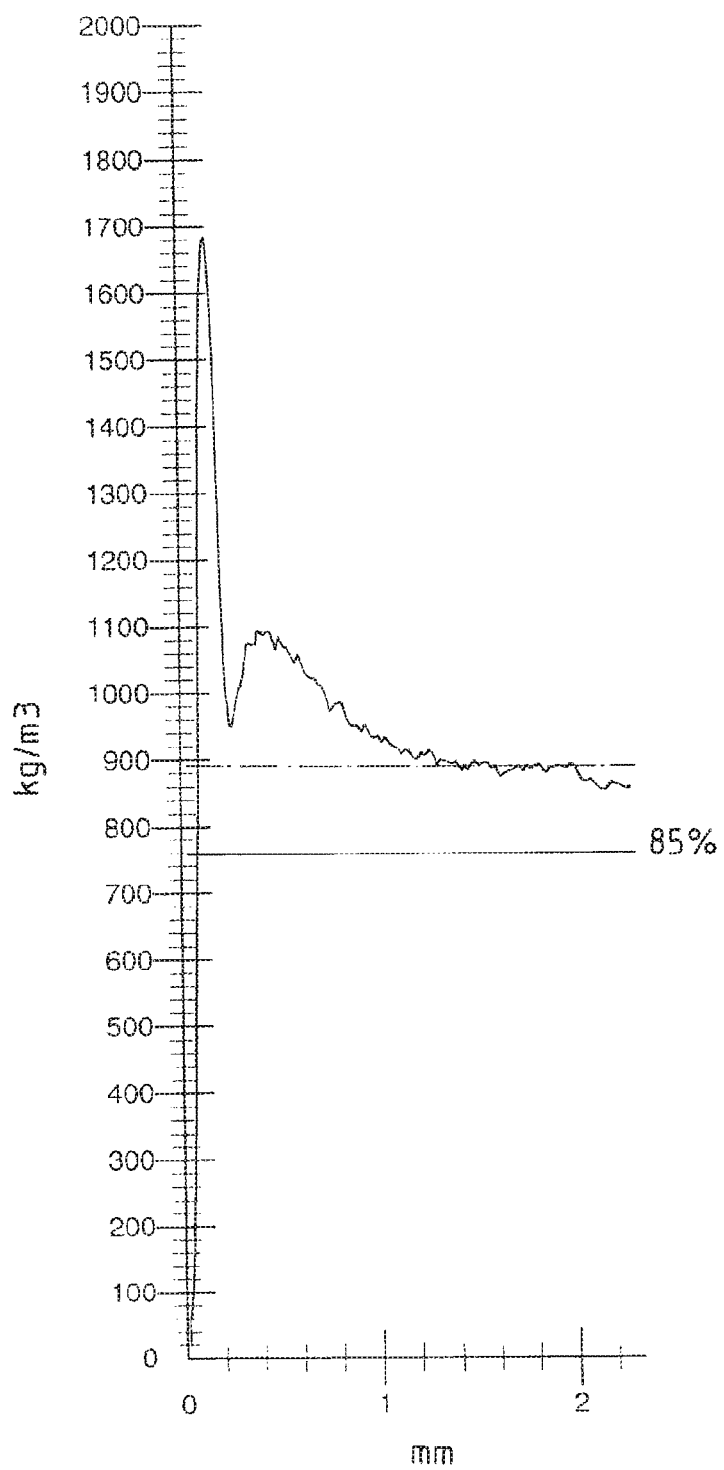
FIG. 1 shows a detail of a densogram of a control sample of a laminate.

A quantity of approximately 1 g water per/m$^2$ was applied by a Rotorspray unit from Ahlbrandt to the top side of an unsanded HDF (fiber board with increased apparent density) in a thickness of 7 mm in continuous passage ahead of an SC press. Thereafter, likewise in continuous passage, 3 g melamine resin powder/m$^2$ were applied to the top side, using a scattering apparatus. The HDF was then covered on the top side with a melamine-resin-impregnated decorative paper and with an overlay. On the bottom side, a backing paper was used which was likewise impregnated with melamine resin. The board was pressed in an SC press at 200° C./40 bar. The pressing time was 10 seconds. The board was cooled and provided for testing. In addition, a control sample (without application of resin on the top side) was co-produced.

Working Example 2

The top side of an unsanded HDF (fiber board with increased apparent density) in a thickness of 7 mm was charged by means of a device for electrostatic charging (manufacturer: Eltex) in continuous passage ahead of an SC press. Thereafter, likewise in continuous passage, 6 g melamine resin powder/m² were likewise applied to the top side, using a scattering apparatus. The HDF was then covered on the top side with a melamine-resin-impregnated decorative paper and with an overlay. On the bottom side, a backing paper was used which was likewise impregnated with melamine resin. The board was pressed in an SC press at 200° C./40 bar. The pressing time was 10 seconds. The board was cooled and provided for testing.

Working Example 3

A quantity of approximately 1 g water per/m² was applied by a Rotorspray unit from Ahlbrandt to the top side of an impregnated backing (100 g/m² paper weight, resin application: 150%) in continuous passage ahead of an SC press. Thereafter, likewise in continuous passage, 6 g melamine resin powder/m² were applied to the top side, using a scattering apparatus. An unsanded 7 mm HDF was placed onto this backing.

The HDF board was wetted on the top side with a quantity of approximately 1 g of water per/m² by a second Rotorspray unit from Ahlbrandt. Thereafter, likewise in continuous passage, 6 g melamine resin powder/m² were applied to the top side of the HDF board, using a scattering apparatus. Thereafter the board was covered on the top side with a melamine-resin-impregnated decorative paper and with an overlay. On the bottom side, a backing paper was used which was likewise impregnated with melamine resin. The board was pressed in an SC press at 200° C./40 bar. The pressing time was 10 seconds.

The samples from working examples 1, 2, a control sample produced using an unsanded HDF as per working example 1 but without pulverulent resin, and a comparative sample with sanded HDF board were subsequently subjected to testing.

In this testing, a modified cross-cut test was carried out with the aid of a cutter blade. Using the blade, cuts were made in the surface of the coated boards, leading to diamond patterns. The blade was then used to attempt to peel the diamonds from the surface. The expenditure of force was then assessed in comparison. Additionally, on the diamonds removed by peeling, the layer thickness made up of coating and adhering fibers was determined. The layer thickness of the coating (overlay and decoration) here was approximately 0.15 mm. Table 1 summarizes the results.

TABLE 1

| Sample | Application rate of melamine resin in g/m² | Cross-cut (expenditure of force) | Layer thickness in mm |
|---|---|---|---|
| Control sample | 0 | Low | 0.29* |
| Sample 1 | 3 | Moderate | 0.35** |
| Sample 2 | 6 | High | 0.39** |
| Comparative sample, sanded | 0 | High | 0.42** |

*The decorative paper can still be seen through the fibers.
**The reverse side of the diamond exhibits complete fiber occupation.

As the table shows, the expenditure of force required in order to peel off the diamonds increases as the amount of melamine resin goes up. There is also an increase in the layer thickness of the fibers also removed on peeling. For sample 2, this thickness is almost as great as that of the sanded board. The difference between the variant with 6 g of melamine resin powder/m² and the control sample can be seen from a comparison of the corresponding densograms (see FIGS. 1 and 2).

Accordingly, in the case of the control sample (FIG. 1), a marked drop in the apparent density can be seen (from 1700 to less than 1000 kg/m³) beneath the coating (0.15 mm) and the fibers adhering to the coating. In the case of the sample with 6 g of melamine resin powder (FIG. 2), this drop is no longer apparent, or is apparent only to little extent. This zone is the cracked press skin. When it can no longer be perceived in the densogram, the weak zone is also no longer present.

Furthermore, the densogram for the control sample in FIG. 1 has a shoulder which suggests a defect. Such defects can lead to instances of delamination. This defect, on the other hand, no longer occurs at 6 g/m² powder (FIG. 2), and so instances of delamination are prevented.

Working Example 4

In a further series of experiments, different amounts of melamine-formaldehyde powder resins applied by scattering to unsanded HDF, with subsequent pressing in a laboratory press, were compared.

The pressing was carried out with an impregnated decorative paper and an overlay on the facing side and an impregnated backing on the reverse side. The pressing time was 10 seconds, the pressing pressure 400 N/cm², and the temperature 200° C.

In order to assess the anchoring of the system on the top side, or the consolidation of the press skin, a cross-cut test was again carried out. In this test, the adhesion of the coating to the board was not tested by means of an adhesive strip, but instead by peeling off the incised surface using a cutter blade. The results are summarized in table 2.

TABLE 2

| Application rate of MF powder resin (g/m²) | Cross-cut result (DIN EN ISO 2409)* |
|---|---|
| 0 | 5 |
| 10 | 2 |
| 20 | 1 |

*)Assessment:
Level 0 = coating removable in small area only with substantial expenditure of force
Level 5 = coating removable in large area with little expenditure of force; coating undergoes partial detachment even when the surface is incised.

The results of the cross-cut test show an increase in the expenditure of force required as the application rate of MF resin powder goes up.

The invention claimed is:

1. A method for producing a laminate comprising a wooden composite board and a decorative paper disposed on the wooden composite board, comprising the steps of:
   a) providing the wooden composite board,
   b) scattering at least one layer of at least one pulverulent resin onto at least one side of the wooden composite board, where a surface of the at least one side of the wooden composite board on which the at least one pulverulent resin is to be scattered is unsanded and bears a press skin or rotting layer;
   c) placing at least one decorative paper onto the at least one side of the wooden composite board that bears the at least one pulverulent resin, and
   d) compressing the wooden composite board, the at least one pulverulent resin and decorative paper, wherein the at least one side of the wooden composite board on which the at least one pulverulent resin is to be scattered is pretreated, before the scattering of the at least one pulverulent resin, to improve an adhesion of the at least one pulverulent resin, wherein the pretreatment of the at least one side on which scattering is to take place comprises subjecting the wooden composite board to moisture or comprises electrostatically charging the wooden composite board, wherein the at least one pulverulent resin has a scatter density of 0.5 to 1.5 kg/l and an average particle size of 10 to 50 μm and is applied in an amount of 3 to 20 g/m² to the wooden composite board, and wherein the decorative paper is an at least partially impregnated decorative paper.

2. The method according to claim 1, wherein the pretreatment of the at least one side on which scattering is to take place comprises subjecting the wooden composite board to 0.5-5 g/m² of water.

3. The method according to claim 2, wherein the pretreatment comprises subjecting the wooden composite board to 1 to 2 g/m² of water.

4. The method according to claim 1, wherein the at least one pulverulent resin is a formaldehyde resin, a urea resin, a melamine resin, a phenolic resin, or a melamine-formaldehyde resin.

5. The method according to claim 4, wherein the at least one pulverulent resin is a melamine-formaldehyde resin or a urea resin.

6. The method according to claim 1, wherein the at least one pulverulent resin is scattered onto at least one side of at least one backing paper, and the at least one backing paper scattered with the at least one pulverulent resin is disposed with the at least one pulverulent resin in a direction of the at least one side of the wooden composite board.

7. The method according to claim 6, wherein at least one side of the wooden composite board is coated with the at least one backing paper, and/or the at least one side of the at least one backing paper that is to be scattered with the at least one pulverulent resin, is pretreated, before scattering of the at least one pulverulent resin, to improve the adhesion of the at least one pulverulent resin.

8. The method according to claim 7, wherein the at least one side of the wooden composite board that is to be coated with the at least one backing paper, and/or the at least one side of the at least one backing paper that is to be scattered with the at least one pulverulent resin, is pretreated by being subjected to moisture or being electrostatically charged.

9. The method according to claim 1, wherein the at least one pulverulent resin is applied using a scattering apparatus.

10. The method according to claim 1, wherein at least one backing paper is an at least partially impregnated backing paper.

11. The method according to claim 1, wherein the wooden composite board consists of a wood-based material or a wood-based material/polymer mixture.

12. The method according to claim 11, wherein the wooden composite board is a particle board, medium density fibre (MDF) board, high-density fibre (HDF) board or oriented strand board (OSB), or plywood board.

13. The method according to claim 1, wherein the at least one pulverulent resin has a scatter density of 0.8 to 1.0 kg/l and an average particle size of 20 to 30 μm.

14. The method according to claim 1, wherein the at least one pulverulent resin is applied in an amount of 6 to 10 g/m² to the wooden composite board.

15. A method for producing a laminate comprising a wooden composite board and a decorative paper disposed on the wood composite board, comprising the steps of:
a) providing the wooden composite board,
b) scattering at least one layer of at least one pulverulent resin onto at least one side of the wooden composite board, where a surface of that side of the wooden composite board on which the at least one pulverulent resin is to be scattered is unsanded and bears a press skin or rotting layer,
c) placing at least one decorative paper onto a side of the wooden composite board that bears the pulverulent resin,
c2) applying at least one overlay onto the at least one decorative paper, and
d) compressing the wooden composite board, the at least one pulverulent resin and the at least one decorative paper,
wherein the at least one pulverulent resin has a scatter density of 0.5 to 1.5 kg/l and an average particle size of 10 to 50 μm and is applied in an amount of 3 to 20 g/m² to the wooden composite board, and
wherein the decorative paper is an at least partially impregnated decorative paper.

16. The method according to claim 15, wherein the at least one overlay applied in step c2) is a resin-impregnated overlay.

17. A method for producing a laminate comprising a wooden composite board and a decorative paper disposed on the wood composite board,
comprising the steps of:
a) providing the wooden composite board,
b) scattering at least one layer of at least one pulverulent resin onto at least one side of the wooden composite board, where a surface of at least one side of the wooden composite board on which the at least one pulverulent resin is to be scattered is unsanded and bears a press skin or rotting layer,
c) placing at least one decorative paper onto the at least one side of the wooden composite board that bears the at least one pulverulent resin,
c1) applying at least one further layer of a pulverulent resin onto the top side of the decorative paper, and
d) compressing the wooden composite board, the at least one pulverulent resin and the at least one decorative paper,
wherein the at least one pulverulent resin has a scatter density of 0.5 to 1.5 kg/l and an average particle size of 10 to 50 μm and is applied in an amount of 3 to 20 g/m² to the wooden composite board, and
wherein the decorative paper is an at least partially impregnated decorative paper.

18. The method according to claim 17, wherein a further layer to be applied in step c1) consists of a mixture comprising the at least one pulverulent resin, natural and/or synthetic fibers, wear-reducing particles, and, optionally, at least one further additive.

19. The method according to claim 18, wherein as further additives at least one additive is selected from a group consisting of conductive substances, flame retardants, luminescent substances, and metals.

20. The method according to claim 18, wherein the at least one further additive comprises a conductive substance.

21. The method according to claim 18, wherein the natural and/or synthetic fibers comprise bleached cellulose fibers or organic polymer fibers.

22. The method according to claim 18, wherein wear-reducing particles comprise at least one of the following: aluminum oxides, corundum, boron carbides, silicon dioxides, silicon carbides and glass beads.

23. The method according to claim 18, wherein the at least one side of the wooden composite board on which the at least one pulverulent resin is to be scattered in step b) is pretreated, before the scattering of the at least one pulverulent resin, to improve an adhesion of the at least one pulverulent resin.

24. The method according to claim 23, wherein the pretreatment of the at least one side on which scattering is to take place in step b) comprises subjecting the wooden composite board to moisture or comprises electrostatically charging the wooden composite board.

25. The method according to claim 23, wherein the pretreatment of the side on which scattering is to take place in step b) comprises subjecting the wooden composite board to 0.5-5 g/m² of water.

26. The method according to claim 18, wherein the at least one pulverulent resin is a formaldehyde resin, a urea resin, a melamine resin or a phenolic resin.

27. The method according to claim 18, wherein the at least one pulverulent resin has a scatter density of 0.5 to 1.5 kg/l, and an average particle size of 10 to 50 μm.

28. The method according to claim 18, wherein the at least one pulverulent resin is scattered onto at least one side of at least one backing paper, and the at least one backing paper scattered with the at least one pulverulent resin is disposed with the at least one pulverulent resin in a direction of the at least one side of the wooden composite board.

29. The method according to claim 28, wherein the at least one side of the wooden composite board on which the at least one backing paper is disposed, and/or the at least one side of the at least one backing paper that is to be scattered with the pulverulent resin, is pretreated, before scattering of the pulverulent resin, to improve an adhesion of the at least one pulverulent resin.

30. The method according to claim 18, wherein the at least one pulverulent resin is applied using a scattering apparatus.

31. The method according to claim 18, wherein the at least one backing paper is an at least partially impregnated backing paper.

32. The method according to claim 18, wherein the wooden composite board consists of a wood-based material or a wood-based material/polymer mixture.

* * * * *